US008376114B2

(12) United States Patent
Orsini et al.

(10) Patent No.: US 8,376,114 B2
(45) Date of Patent: Feb. 19, 2013

(54) DUNNAGE DISCHARGE SAFETY CHUTE

(75) Inventors: Thomas P. Orsini, Leominster, MA (US); Kostadin I. Kostadinov, Billerica, MA (US); Russell Christman, Dunstable, MA (US)

(73) Assignee: Sealed Air Corporation, Elmwood Park, NJ (US)

( * ) Notice: Subject to any disclaimer, the term of this patent is extended or adjusted under 35 U.S.C. 154(b) by 702 days.

(21) Appl. No.: 12/559,073

(22) Filed: Sep. 14, 2009

(65) Prior Publication Data

US 2011/0061986 A1 Mar. 17, 2011

(51) Int. Cl.
*F16P 3/08* (2006.01)
*B31B 1/00* (2006.01)
*B31F 1/00* (2006.01)

(52) U.S. Cl. .......... 192/127; 493/33; 493/464; 493/967; 192/130; 192/133

(58) Field of Classification Search .................. 192/126, 192/127, 130, 133; 493/33, 464, 967
See application file for complete search history.

(56) References Cited

U.S. PATENT DOCUMENTS

| | | | | | |
|---|---|---|---|---|---|
| 4,416,651 | A * | 11/1983 | Sullivan et al. | 493/12 |
| 4,429,217 | A * | 1/1984 | Hill et al. | 53/206 |
| 5,581,982 | A * | 12/1996 | Schroeder et al. | 53/459 |
| 5,938,580 | A | 8/1999 | Siekmann | |
| 7,572,216 | B2 | 8/2009 | Harding | |
| 7,614,994 | B2 * | 11/2009 | Harding et al. | 493/464 |
| 7,722,519 | B2 * | 5/2010 | Timmers et al. | 493/464 |
| 7,866,125 | B2 * | 1/2011 | Simmons et al. | 493/464 |
| 2009/0258775 | A1 * | 10/2009 | Chan et al. | 493/464 |
| 2011/0047941 | A1 * | 3/2011 | Metzger | 53/469 |

FOREIGN PATENT DOCUMENTS

| | | | |
|---|---|---|---|
| EP | 1 393 888 | A2 | 3/2004 |
| WO | WO 99/14033 | A2 | 3/1999 |
| WO | WO 2006/091789 | A2 | 8/2006 |

OTHER PUBLICATIONS

International Search Report and Written Opinion for Application No. PCT/US2010/048056 dated Jan. 25, 2011.

* cited by examiner

*Primary Examiner* — David D Le
*Assistant Examiner* — Jacob S Scott
(74) *Attorney, Agent, or Firm* — Alston & Bird LLP

(57) ABSTRACT

A dunnage discharge chute includes features designed to prevent injury to an operator of a dunnage producing machine. The dunnage discharge chute includes at least one door with sensors that monitor the position of the door and output position signals. The position signals are received by a controller which outputs a control signal that disables operation of the dunnage producing machine based at least in part on a change in the position signals over a predetermined period of time. Additional sensors may detect whether the door is open beyond an upper open position, and a relay may disable operation of the dunnage producing machine immediately if the door is opened beyond the upper open position. Thus, if the operator reaches in through the door, the dunnage discharge chute will disable operation of the dunnage producing machine.

22 Claims, 4 Drawing Sheets

DUNNAGE DISCHARGE SAFETY CHUTE

BACKGROUND OF THE INVENTION

1. Field of the Invention

The present invention generally relates to an apparatus and method configured to output dunnage product from a dunnage producing machine and prevent injury to an operator of the dunnage producing machine.

2. Description of Related Art

Paper dunnage producing machines are conventionally used to form paper cushioning material, typically from a roll of stock paper. For example, FIG. 1 illustrates a paper dunnage producing machine 101, such as the PACKTIGER™ Paper Cushioning System, available from Sealed Air Corporation of Elmwood Park, N.J. The machine 101 generally operates by dispensing a web 102 having one or more sheets of paper from a supply roll 103 and folding the paper to create a cushioning material 104. The paper web 102 is typically flat as it is dispensed from the supply roll 103. That is, each sheet of the paper defines a straight line across its width between the opposite lateral edges 105, 106 of the web 102. The machine 101 folds the paper web 102 from the flat configuration to a folded configuration by folding the lateral edges 105, 106 of the continuous web 102 inward toward the center 158 of the width of the web 102 and/or crumpling some portions of the web 102. The folding may occur by directing the paper web 102 thorough a forming frame 109, which may comprise a pair of inwardly curved arms 109*a*, 109*b*. The forming frame 109 defines a width which is less than the width of the paper web 102, and thereby the lateral edges 105, 106 are forced to fold inwardly as the paper web travels through the forming frame. The crumpling may be created by a pair of counter-rotating crumpling gears located within the housing 111 of the machine 101 through which the web 102 travels after the lateral edges 105, 106 are folded inward. Relative to the flat web 102, the finished cushioning material 104 has a reduced width and an increased thickness.

The machine 101 may include castors or wheels 107 for moving the machine 101 to different locations. For example, the machine 101 may be located proximate to a packaging area such that a operator has easy access to the pads exiting a discharge chute 113 while he or she packages merchandise into containers. The cushioning material 104 may be cut to desired lengths to form individual cushioning pads. The desired length of the pads may vary depending on the intended application of the cushioning pads. For example, the cushioning pads may be used as dunnage between the inside surfaces of a box or other container and merchandise disposed in the container to protect the merchandise during shipping, handling, storing, and the like. Therefore, the desired length may be at least partially based on the size of the container and merchandise and/or the technique (e.g., cross-cross, coil and multi-pad techniques) used to cushion or block and brace the merchandise in the container. The cushioning material 104 may be cut manually by the user, or blades within the housing 111 of the machine 101 may cut the cushioning material when requested by the operator or at regular intervals. However, when the blades are located within the housing 111, there is the potential for the operator to be injured by improperly reaching through the discharge chute 113. In addition, the counter-rotating crumpling gears present a pinch point that could be injurious to an operator who reaches into the discharge chute 113.

BRIEF SUMMARY OF THE INVENTION

Accordingly, there is herein provided a dunnage discharge chute configured to output dunnage product from a dunnage producing machine and prevent injury to an operator of the dunnage producing machine. The dunnage discharge chute comprises a chute configured to output the dunnage product from the dunnage producing machine, a door moveable between a closed position wherein the door substantially or completely closes the chute and one or more open positions, wherein the chute is at least partially open. One or more sensors, which may comprise optical flag sensors, are configured to detect the position of the door and each output a position signal indicating whether the door is open beyond at least one corresponding open position or not, and a controller is configured to receive the position signals and determine whether at least one of the position signals changes over a predefined period of time, which may be greater than or equal to an expected door position time interval. The controller outputs a control signal that disables operation of the dunnage producing machine based at least in part on a change in the position signals over the predefined period of time in order to prevent injury to the operator as caused by access to the dunnage producing machine through the chute.

In some embodiments the controller is configured to output the control signal that disables operation of the dunnage producing machine if the position signals indicate that the door remains open beyond the corresponding open position for at least the predefined interval of time. In these embodiment the one or more sensors may comprise at least a first sensor and a second sensor, wherein the controller is configured to output the control signal that disables operation of the dunnage producing machine if the position signal from either the first sensor or the second sensor indicates that the door is open beyond the corresponding open position for longer than the predefined period of time, and the position signal from the other of the first sensor or the second sensor does not change to indicate that the door is open not beyond the corresponding open position during the predefined interval of time. Similarly, the controller may additionally or alternatively be configured to output the control signal that disables operation of the dunnage producing machine if the position signals indicate that the door remains open not beyond the corresponding open position for at least the predefined interval of time. In such embodiments the one or more sensors may comprise a first sensor and a second sensor, wherein the controller is configured to output the control signal that disables operation of the dunnage producing machine if the position signal from either the first sensor or the second sensor indicates that the door is open not beyond the corresponding open position for the predefined interval of time, and the position signal from the other of the first sensor or the second sensor does not change to indicate that the door is open beyond the corresponding open position during the predefined interval of time.

Additionally, the controller may be configured to output a control signal that disables operation of the dunnage producing machine when one or more of the sensors fail. Further, the controller may be configured to output the control signal that disables operation of the dunnage producing machine if the one or more sensors indicate that the door is open beyond the corresponding open position prior to operation of the dunnage producing machine. In some embodiments the door, and/or an additional an inner door may be configured to pivotally open outwardly to allow egress of dunnage product, but not pivotally open inwardly.

Further, the one or more open positions of the door may comprise an upper open position, wherein the control signal is interrupted in order to disable operation of the dunnage producing machine if the position signals indicate that the door is open beyond the corresponding open position for the upper open position without waiting for the predefined interval of time to elapse. At least two of the one or more sensors may be configured to output the position signals indicating whether the door is open beyond the corresponding open position for the upper open position. The dunnage discharge chute may further comprise a relay, wherein the relay receives the position signals and interrupts the control signal.

Embodiments of the invention also provide methods of controlling the operation of a dunnage producing machine comprising a chute with a door and preventing injury to an operator of the dunnage producing machine. The method comprises receiving one or more position signals from one or more sensors indicating whether the door is open beyond at least one corresponding open position or not, and enabling or disabling operation of the dunnage producing machine based at least in part on whether at least one of the positions signals changes over a predefined period of time. In such methods the operation of the dunnage producing machine is disabled in order to prevent injury to the operator as caused by access to the dunnage producing machine through the chute.

The method may also comprise disabling operation of the dunnage producing machine if after the dunnage producing machine begins operating the position signals indicate that the door remains open beyond the corresponding open position for at least the predefined interval of time. In such embodiments the method may further include receiving the position signals from at least a first sensor and a second sensor, and disabling operation of the dunnage producing machine if the position signal from either the first sensor or the second sensor indicates that the door is open beyond the corresponding open position for the predefined interval of time, and the position signal from the other of the first sensor or the second sensor does not change to indicate that the door is not open beyond the corresponding open position during the predefined interval of time. Alternatively or additionally the method may further comprise disabling operation of the dunnage producing machine if after the dunnage producing machine begins operating the position signals indicate that the door remains not open beyond the corresponding open position for at least the predefined interval of time. In such embodiments the method may additionally comprise receiving the position signals from at least a first sensor and a second sensor, and disabling operation of the dunnage producing machine if the position signal from either the first sensor or the second sensor indicates that the door is not open beyond the corresponding open position for the predefined interval of time, and the position signal from the other of the first sensor or the second sensor does not change to indicate that the door is open beyond the corresponding open position during the predefined interval of time.

Further, the corresponding open positions may comprise an upper open position, and the method may also comprise disabling operation of the dunnage producing machine when the door is open beyond the corresponding open position for the upper open position without waiting for the predefined interval of time to elapse. The method may also disable operation of the dunnage producing machine when one or more of the sensors fail. Additionally, the method may include selecting the predefined time interval to be greater than or equal to an expected door position time interval

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which some, but not all embodiments of the inventions are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As described above, paper dunnage producing machines provide a convenient arrangement by which to produce cushioning material in pads of desired length. However, the gears and/or cutting blades may constitute a safety hazard to the operator of the paper dunnage producing machine. The cutting blades in particular may potentially be harmful to the operator of the dunnage producing machine because in many dunnage producing machines the cutting blades are located after the counter-rotating gears in terms of paper flow through the machine, and hence the blades are located proximate the discharge chute.

Additionally, paper jams within paper dunnage producing machines are known to occur occasionally. The combination of sharp cutting blades, which may be accessible via the discharge chute, and the possibility for paper jams creates a potentially dangerous situation. In particular, despite warnings to the contrary, an operator of a paper dunnage producing machine may be tempted to reach in through the discharge chute in order to free a paper jam. In doing so, the operator faces the risk of serious injury to the fingers and hand.

Figure 2:
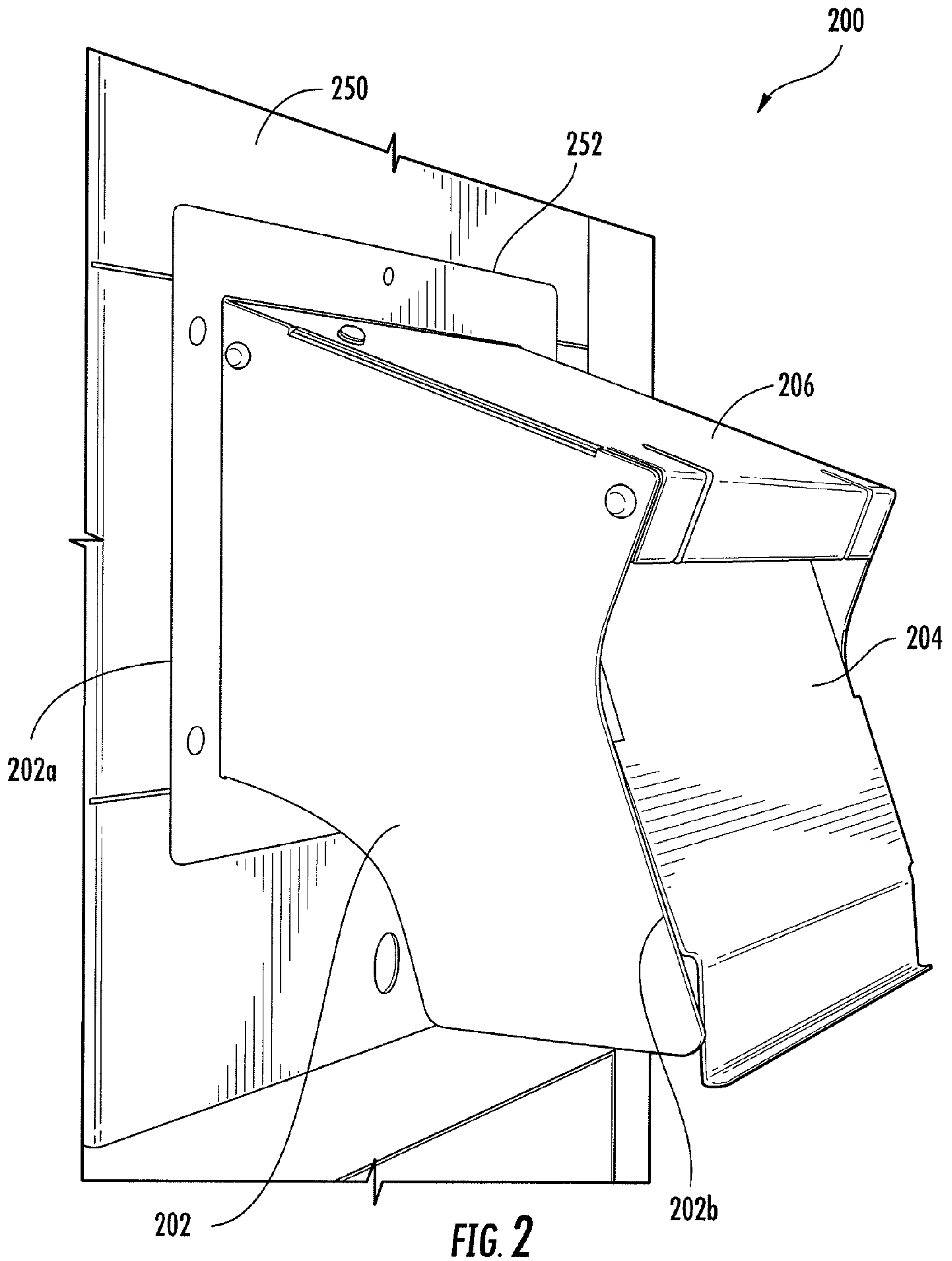
FIG. 2 illustrates a perspective view of a discharge chute according to the invention.

Accordingly, Applicants herein provide methods and apparatuses configured to output dunnage product and prevent injury to the operator of the dunnage producing machine. FIG. 2 illustrates an embodiment of a dunnage discharge chute 200, which as will be described later, comprises a number of features configured to prevent injury to the operator of the dunnage producing machine 250. Generally, the dunnage discharge chute 200 comprises a chute 202 which is configured to output dunnage product from the dunnage producing machine 250. Accordingly, a first end 202*a* of the chute 202 is in communication with an outlet 252 of the dunnage producing machine 250 downstream of the above-described counter-rotating gears and/or cutting blades or other paper processing machinery. The chute 202 may comprise any type and shape of conduit comprising sufficient dimensions to allow dunnage product to travel therethrough. The dunnage discharge chute 200 further comprises a door 204 which may be located at a second end 202*b* of the chute 202. Although the door 204 is illustrated as being coupled to the chute 202, this is not necessary in all embodiments. Additionally, an upper cover 206 is secured to the chute 202. The upper cover 206 may be removable in order to allow for servicing of the dunnage discharge chute 200.

Figure 3:
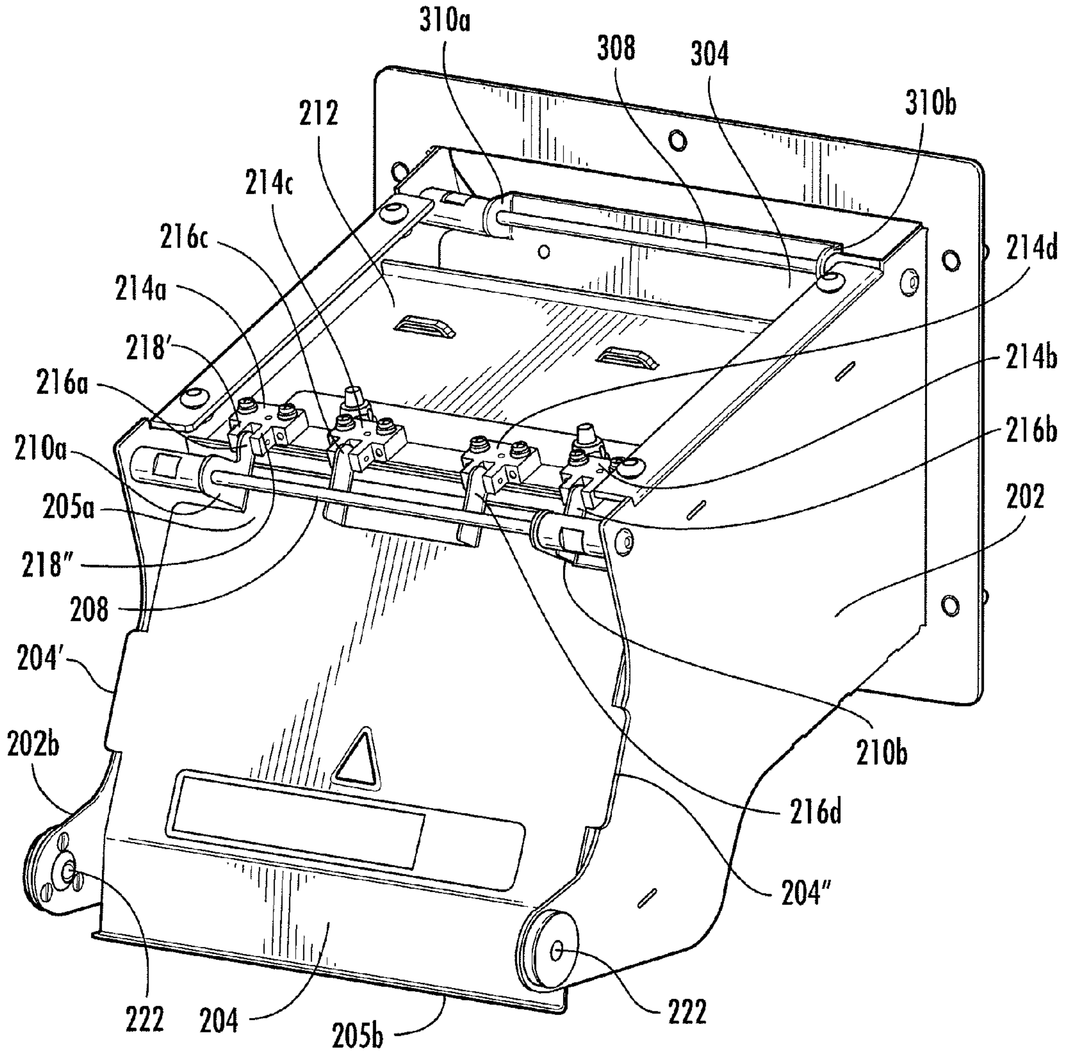
FIG. 3 illustrates an alternate perspective view of the discharge chute of FIG. 2, with the top cover removed, and which further comprises spring loaded door stops.

FIG. 3 illustrates a similar embodiment of the dunnage discharge chute 200 of FIG. 2 from an alternate perspective. In FIG. 3, the upper cover 206 (see FIG. 2) has been removed to illustrate internal portions of the dunnage discharge chute 200. As illustrated, the door 204 is pivotally coupled to the chute 200 proximate the second end 202*b* of the chute. In particular, an axle 208 provides the point about which the door 204 may hingedly pivot. The door 204 is connected to the axle by a plurality of mounting tabs 210*a, b*. As a result of the axle 208 being connected to the top 205*a* of the door 204, the bottom 205*b* of the door is able to pivot away from the second end 202*b* of the chute 202. The dunnage discharge chute 200 may further comprise an inner door 304, the operation of which will be described below. Briefly, however, the inner door 304 also pivots on an axle 308 by way of a plurality of mounting tabs 310*a, b*.

The dunnage discharge chute 200 may additionally comprise a top shield 212. The top shield 212 prevents the operator of the dunnage producing machine from bypassing the door 204 by reaching into the chute 202 through the top of the chute when the upper cover 206 (see FIG. 2) is removed. The top shield 212 may also be used to mount one or more sensors 214*a-d*. The operation of the sensors 214*a-d* will be described in detail below. Briefly, however, the sensors 214*a-d* detect the position of the door 204. Although various types of sensors may be used, the illustrated sensors 214*a-d* comprise optical flag sensors which detect the position of the door 204 by detecting whether a beam of light directed between the two prongs 218', 218" of each sensor is interrupted by a corresponding tab 216*a-d* attached to the door.

Figure 4:
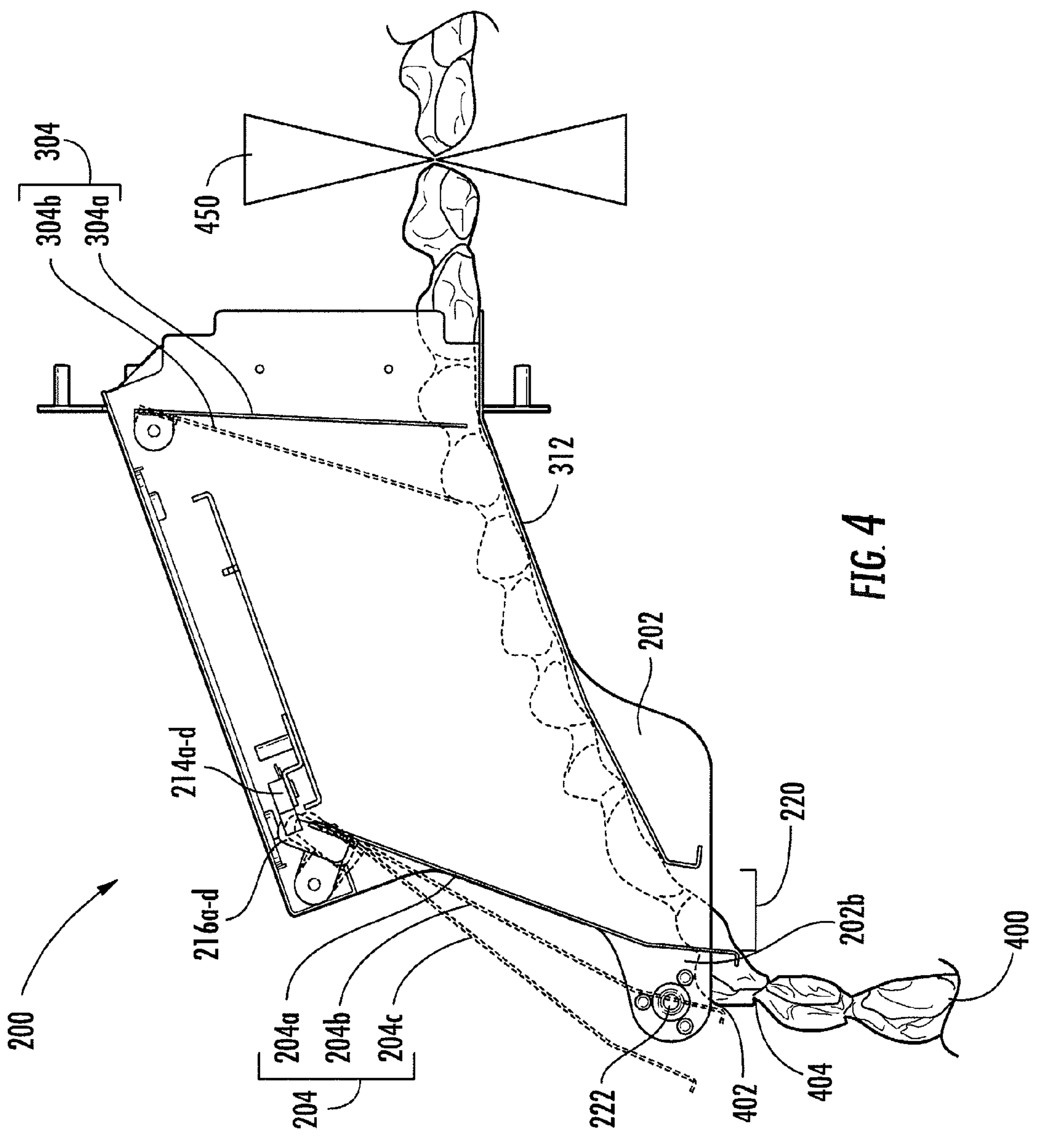
FIG. 4 illustrates a sectional view of the dunnage discharge chute of FIG. 3 showing several positions of the doors.

FIG. 4 illustrates a sectional view of the dunnage discharge chute 200 during various states of operation. The door 204 is illustrated in three different positions 204*a-c*. The first position of the door 204 is a closed position 204*a*. The door 204 sits in the closed position 204*a* when no dunnage product 400 is exiting from the chute 202. In some embodiments the door 204 may completely close the chute 202. However, in other embodiments the door 204 may not completely close the chute 202 in the closed position 204*a*. In particular, a pair of winglets 204', 204" (see FIG. 3) may extend from the door 204 and thus in the closed position 204*a*, the winglets may contact the second end 202*b* of the chute 202, leaving a small open gap 220 at the end of the chute. The open gap 220 may allow the dunnage product 400 to more easily push open the door 204 to as it exits the chute 202. The winglets 204', 204" also prevent the door 204 from pivotally opening inwardly. Thus, the door 204 is configured to pivotally open outwardly to allow egress of dunnage product 400, but prevent the door from pivoting inwardly. The inner door 304 may also be passively opened by the dunnage product 400 as it travels through the chute 202. Thus, the inner door 304 may be moveable between a closed position 304*a* and an open position 304*b*. Similarly to the door 204, the inner door 304 may comprise features which allow the inner door to pivotally open outwardly to allow egress of the dunnage product 400, but not pivotally open inwardly. For example, the inner door 304 may contact a bottom shield 312 when an attempt is made to pivot it inwardly, although various other structures may be used to prevent inward pivoting movement. Regardless of the particular structures involved, preventing the inner door 304 from pivotally opening inwardly helps resist access through the chute 202 to the cutting blades 450 (illustrated schematically) within the dunnage producing machine to which the dunnage discharge chute 200 attaches.

As illustrated in FIG. 4, the door 204 is moveable from the closed position 204*a* to one or more open positions 204*b, c*. The lower open position 204*b* corresponds to a position the door 204 opens to during normal dunnage discharge operation. As briefly described above, one or more sensors 214*a-d* may be configured to detect the position 204*a-c* of the door 204. As illustrated in FIG. 3, first 214*a* and second 214*b* sensors are configured to detect the position of the door 204 and each output a position signal indicating whether the door is open beyond the lower open position 204*b* (see FIG. 4). The respective tabs 216*a* and 216*b* are shaped and sized such that the first 214*a* and second 214*b* sensors detect when the door 204 opens beyond the lower open position 204*b*. For example, the first 214*a* and second 214*b* sensors may output an "ON" position signal when the door 204 is in the closed position 204*a*. However, the first 214*a* and second 214*b* sensors would then output an "OFF" position signal when the door 204 is open at or beyond the lower open position 204*b*.

The position signals are received by a controller, such as a programmable logic controller, which enables or disables operation of the dunnage producing machine. In some embodiments the controller may be programmed to disable operation of the dunnage producing machine if the door 204 is not in the closed position 204*a* at the time the operator attempts to begin operation of the dunnage producing machine. In terms of the above-described position signals, the controller would output a control signal disabling operation of the dunnage producing machine if either the first sensor 214*a* or the second sensor 214*b* outputs an OFF position signal. However, if both the first sensor 214*a* and the second sensor 214*b* output ON position signals, the controller will output a control signal enabling the dunnage producing machine to start operating. This startup routine allows the dunnage discharge chute 200 to detect the potentially dangerous situation of the door 204 being open at or beyond the lower open position 204*b*, and prevent starting operation of the dunnage producing machine if this situation is found to exist. For example, if someone was reaching into the chute 200, the door 204 would be open beyond the lower open position 204*b*, and hence the dunnage producing machine would be disabled from operating. Additionally, if either of the first 214*a* or second 214*b* sensors fails and outputs an OFF position signal, the controller will interpret this to mean that the door 204 is open, and will disable operation of the dunnage producing machine.

Embodiments of the dunnage discharge chute 200 alternatively or additionally include additional safety features. In particular, the position signals outputted by the first 214*a* and second 214*b* sensors may be monitored by the controller over time to determine that the dunnage product is outputting properly and that the door 204 is not being tampered with. In this regard, the movement of the door 204 during operation must be described. When the dunnage product 400 first travels down the chute 200, it contacts the door 204, causing it to open from the closed position 204*a*. The door 204 is prevented from possibly swinging open past an upper open position 204*c* by spring loaded door stops 222. As the dunnage product 400 exits the chute 200, the door 204 is moved to the lower open position 204*b* as peaks 402 of the dunnage product (as created, for example, by counter-rotating gears) contact the door. However, when valleys 404 of the dunnage product 400 contact the door 204, the door will be open slightly less than the lower open position 204*b*. Thus, during normal operation, the repeating pattern of peaks 402 and valleys 404 embossed in the dunnage product cause the position signals from the first 214*a* and second 214*b* sensors to repeatedly switch from indicating that the door 204 is open beyond the lower open position 204*b* (i.e. OFF) to indicating that the door is not open beyond the lower open position (i.e. ON).

The controller can receive the position signals and then disable operation of the dunnage producing machine depending on whether or not the position signals change as expected over a predetermined period of time. For example, the controller can be configured to output a control signal disabling operation of the dunnage producing machine if the position signals indicate that the door remains open beyond the lower open position 204*b* or conversely not open beyond the lower open position for at least the predetermined period of time. With regard to the predetermined period of time, it can be set such that it is at least as long as an expected door position time interval. For example, the predetermined period of time can be set to be at least as long as the amount of time it normally takes the door 204 to open to the lower open position 204*b* as the dunnage product 400 moves from a valley 404 to a peak 402 during normal operation. Alternatively or additionally, the predetermined period of time can be set such that it is at least as long as the amount of time it normally takes the door 204 to close such that it is open less than the lower open position 204*b* as the dunnage product 400 moves from a peak 402 to a valley 404 during normal operation. In a further alternative or additional embodiment, the predetermined period of time can be set such that it is at least as long as the amount of time it normally takes the dunnage product 400 to travel out of the dunnage producing machine, down the chute 200 and open the door 204 to the lower open position 204*b*. This embodiment accounts for any lead time that may occur when the dunnage product 400 is first being produced.

Only one door position detecting sensor is necessary to detect whether or not the door 204 is changing position over the predetermined period of time. However, embodiments of the invention use position signals from multiple sensors for redundancy purposes given the potential harm which could otherwise occur to the operator, as described above. Accordingly, in some embodiments of the invention, the controller outputs a control signal which disables operation of the dunnage producing machine if the position signal from either the first sensor 214*a* or the second sensor 214*b* indicates that the door 204 is open beyond the lower open position 204*b* for longer than the predefined period of time, and the position signal from the other of the first sensor or the second sensor does not change to indicate that the door is not open beyond the lower open position during the predefined interval of time. Conversely, the controller may alternatively or additionally output a control signal which disables the operation of the dunnage producing machine if the position signal from either the first sensor 214*a* or the second sensor 214*b* indicates that the door 204 is not open beyond the lower open position 204*b* for longer than the predefined period of time, and the position signal from the other of the first sensor or the second sensor does not change to indicate that the door is open beyond the lower open position during the predefined interval of time.

Regardless of the particular time interval selected, the controller monitors the change in the position signals as described above, which correspond to the repeating "bounces" of the door 204 as it moves beyond the lower open position 204*b* as a dunnage product peak 402 passes by and then closes slightly as a valley 404 passes by in a continuing pattern. When an expected change in one of the position signals does not occur, the controller is programmed to consider this to mean that an unsafe condition exists, and the controller outputs a control signal disabling operation of the dunnage producing machine. For example, the lack of a change in the position signal could be the result of someone holding the door 204 open while reaching into the chute 202, and accordingly the controller disables operation of the dunnage producing machine. This control scenario may also have the added benefit of monitoring for paper jams. If the expected "bouncing" of the door is not detected as described above, this could be the result of a paper jam, and hence the dunnage producing machine may shut down as the result of a paper jam. As a further result of this control scenario, if either the first sensor 214*a* or the second sensor 214*b* fails by continuously outputting either the ON or OFF position signals, the controller will disable the dunnage producing machine because there will not be an expected change in the position signal, as described above.

In further embodiments, sensors may be configured to indicate whether or not the door 204 is open beyond an upper open position 204*c*. The one or more sensors 214*a, b* that detect whether or not the door 204 is open beyond the lower open position 204*b* may in some embodiments also detect whether the door is open beyond the upper open position, although such embodiments may require sensors other than optical flag sensors, which typically only output two signals (ON or OFF). Accordingly, in the illustrated embodiment, third 214*c* and fourth 214*d* sensors are used to detect whether the door 204 is open beyond the upper open position 204*c* or not. Similarly to the above-described first 214*a* and second 214*b* sensors, the third 214*c* and fourth 214*d* sensors operate in conjunction with respective tabs 216*c* and 216*d* that are shaped and sized such that the third and fourth sensors detect when the door 204 opens beyond the upper open position 204*c*. For example, the third 214*c* and fourth 214*d* sensors may output an ON position signal when the door 204 is not open beyond the upper open position 204*c*. However, the third 214*c* and fourth 214*d* sensors would output an OFF position signal when the door 204 is at least open to the upper open position 204*b*.

As described above, during normal operation the door 204 is prevented from swinging open to the upper open position 204*c* by one or more spring loaded door stops 222. However, occasional maintenance to the dunnage discharge chute 200 may be required. Accordingly, the spring loaded stops 222 may be overcome by the operator when necessary to open up the door 204 to the upper open position 204*c* and allow greater access to the inside of the chute 202. However, for the safety of the operator, the dunnage producing machine should not be operating when the door 204 is open to the upper open position 204*c*. Accordingly, the control signal may be interrupted in order to disable operation of the dunnage producing machine if the position signals indicate that the door 204 is open beyond the upper open position 204*c*. For example, a relay may receive the position signals and interrupt the control signal. Additionally, the relay may interrupt the control signal in order to disable operation of the dunnage producing machine without waiting for a predefined interval of time to elapse. Thus, if the operator lifts the door 204 open to the upper open position 204*c* in order to reach into the chute 202, the relay will interrupt the control signal and thereby disable the operation of the dunnage producing machine substantially immediately.

As with the lower open position 204*c*, the upper open position may be detected by use of a single sensor. However, the illustrated embodiment uses two sensors 214*c, d* to detect the upper open position 204*c* for redundancy purposes. Use of two or more sensors provides additional assurance that the position signals are correctly indicating the position of the door 204. However, it is still possible for a sensor to fail. For example, as described above, the third 214*c* and fourth 214*d* sensors may be configured to output an ON signal when the door 204 is open not beyond the upper open position 204*c* and configured to output an OFF signal when the door is open beyond the upper open position. If either one or both of the third 214*c* and fourth 214*d* sensors fails and outputs an OFF signal, the relay shuts the dunnage producing machine down independent of the machine control. Accordingly, the potential failure of a sensor is accounted for.

Figure 1:
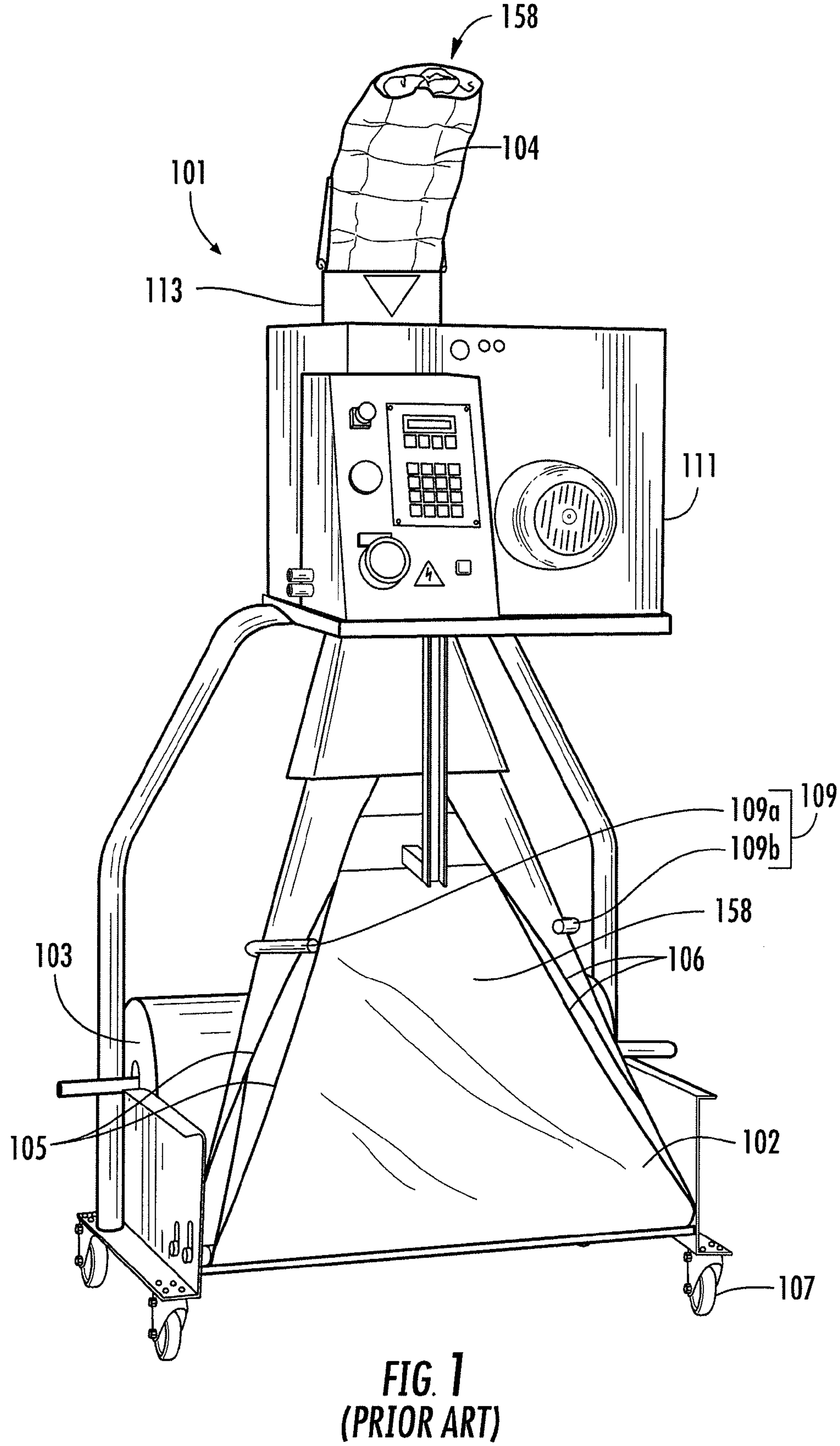
FIG. 1 (PRIOR ART)
FIG. 1 illustrates a prior art dunnage producing machine.

Many other embodiments of the dunnage discharge chute 200 are possible. For example, although the dunnage discharge chute 200 is oriented such that dunnage product 400 exits the chute 202 from a side of the dunnage producing machine, other orientations, such as the vertical discharge orientation illustrated in FIG. 1 are possible. However, some such orientations may require that the door 204 to be spring loaded such that it is biased by force of the spring to a closed position when the orientation does not allow the force of gravity to do so.

Many modifications and other embodiments of the invention set forth herein will come to mind to one skilled in the art to which these inventions pertain having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A dunnage discharge chute configured to output dunnage product from a dunnage producing machine and prevent injury to an operator of the dunnage producing machine, comprising:

a chute configured to output the dunnage product from the dunnage producing machine;

a door pivotally moveable between a closed position, wherein the door substantially or completely closes the chute, and one or more open positions, wherein the chute is at least partially open;

one or more sensors configured to detect the position of the door and each output a position signal indicating whether the door is open beyond at least one corresponding open position or not; and a controller configured to receive the position signals and determine whether at least one of the position signals changes over a predefined period of time, wherein the controller outputs a control signal that disables operation of the dunnage producing machine based at least in part on a change in the position signals over the predefined period of time in order to prevent injury to the operator as caused by access to the dunnage producing machine through the chute.

2. The dunnage discharge chute of claim 1, wherein the controller is configured to output the control signal that disables operation of the dunnage producing machine if the position signals indicate that the door remains open beyond the corresponding open position for at least the predefined interval of time.

3. The dunnage discharge chute of claim 2, wherein the one or more sensors comprise at least a first sensor and a second sensor, and wherein the controller is configured to output the control signal that disables operation of the dunnage producing machine if the position signal from either the first sensor or the second sensor indicates that the door is open beyond the corresponding open position for longer than the predefined period of time, and the position signal from the other of the first sensor or the second sensor does not change to indicate that the door is not open beyond the corresponding open position during the predefined interval of time.

4. The dunnage discharge chute of claim 1, wherein the controller is configured to output the control signal that disables operation of the dunnage producing machine if the position signals indicate that the door remains not open beyond the corresponding open position for at least the predefined interval of time.

5. The dunnage discharge chute of claim 4, wherein the one or more sensors comprise a first sensor and a second sensor, and wherein the controller is configured to output the control signal that disables operation of the dunnage producing machine if the position signal from either the first sensor or the second sensor indicates that the door is not open beyond the corresponding open position for the predefined interval of time, and the position signal from the other of the first sensor or the second sensor does not change to indicate that the door is open beyond the corresponding open position during the predefined interval of time.

6. The dunnage discharge chute of claim 1, wherein the controller is configured to output a control signal that disables operation of the dunnage producing machine when one or more of the sensors fail.

7. The dunnage discharge chute of claim 1, wherein the controller is configured to output the control signal that disables operation of the dunnage producing machine if the one or more sensors indicate that the door is open beyond the corresponding open position prior to operation of the dunnage producing machine.

8. The dunnage discharge chute of claim 1, further comprising an inner door, wherein the inner door is configured to pivotally open outwardly to allow egress of dunnage product, but not pivotally open inwardly.

9. The dunnage discharge chute of claim 1, wherein one or more of the sensors comprises an optical flag sensor.

10. The dunnage discharge chute of claim 1, wherein the door is configured to pivotally open outwardly to allow egress of dunnage product, but not pivotally open inwardly.

11. The dunnage discharge chute of claim 1, wherein the one or more open positions of the door comprise an upper open position, and wherein the control signal is interrupted in order to disable operation of the dunnage producing machine if the position signals indicate that the door is open beyond the corresponding open position for the upper open position without waiting for the predefined interval of time to elapse.

12. The dunnage discharge chute of claim 11, wherein at least two of the one or more sensors are configured to output the position signals indicating whether the door is open beyond the corresponding open position for the upper open position.

13. The dunnage discharge chute of claim 11, further comprising a relay, wherein the relay receives the position signals and interrupts the control signal.

14. The dunnage discharge chute of claim 1, wherein the predefined period of time is greater than or equal to an expected door position time interval.

15. A method of controlling the operation of a dunnage producing machine comprising a chute with a door and preventing injury to an operator of the dunnage producing machine, the method comprising:

receiving one or more position signals from one or more sensors indicating whether the door is open beyond at least one corresponding open position or not;

enabling or disabling operation of the dunnage producing machine based at least in part on whether at least one of the positions signals changes over a predefined period of time, wherein operation of the dunnage producing machine is disabled in order to prevent injury to the operator as caused by access to the dunnage producing machine through the chute.

16. The method of claim 15, further comprising disabling operation of the dunnage producing machine if after the dunnage producing machine begins operating the position signals indicate that the door remains open beyond the corresponding open position for at least the predefined interval of time.

17. The method of claim 16, further comprising receiving the position signals from at least a first sensor and a second sensor, and disabling operation of the dunnage producing machine if the position signal from either the first sensor or the second sensor indicates that the door is open beyond the corresponding open position for the predefined interval of time, and the position signal from the other of the first sensor or the second sensor does not change to indicate that the door is not open beyond the corresponding open position during the predefined interval of time.

18. The method of claim 15, further comprising disabling operation of the dunnage producing machine if after the dunnage producing machine begins operating the position signals indicate that the door remains not open beyond the corresponding open position for at least the predefined interval of time.

19. The method of claim 18, further comprising receiving the position signals from at least a first sensor and a second sensor, and disabling operation of the dunnage producing machine if the position signal from either the first sensor or the second sensor indicates that the door is open not beyond the corresponding open position for the predefined interval of time, and the position signal from the other of the first sensor or the second sensor does not change to indicate that the door is open beyond the corresponding open position during the predefined interval of time.

20. The method of claim 15, wherein the corresponding open positions comprise an upper open position, and further comprising disabling operation of the dunnage producing machine when the door is open beyond the corresponding open position for the upper open position without waiting for the predefined interval of time to elapse.

21. The method of claim 15, further comprising disabling operation of the dunnage producing machine when one or more of the sensors fail.

22. The method of claim 15, further comprising selecting the predefined time interval to be greater than or equal to an expected door position time interval.

* * * * *